Sept. 28, 1937.  D. M. McBEAN ET AL  2,094,460
BOX FILLING MACHINE
Filed March 21, 1935  5 Sheets-Sheet 4

INVENTOR
DOUGLAS M. McBEAN.
WILLIAM T. MARTIN.
BY
Bartlett, Eyre, Scott & Keel
ATTORNEY Sept. 28, 1937.　　　D. M. McBEAN ET AL　　　2,094,460
BOX FILLING MACHINE
Filed March 21, 1935　　　5 Sheets-Sheet 5
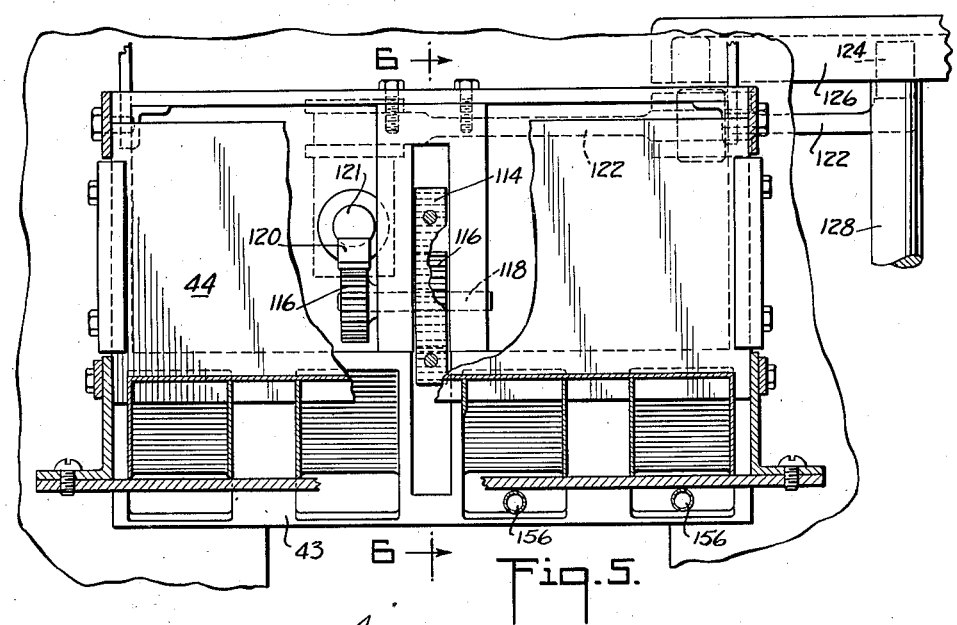
Fig.5.
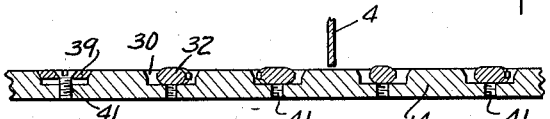
Fig.8.
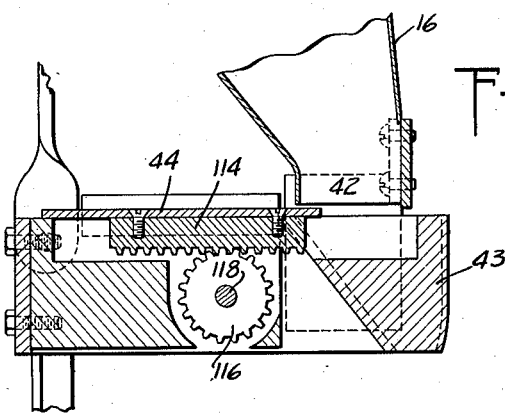
Fig.6.
Fig.7.
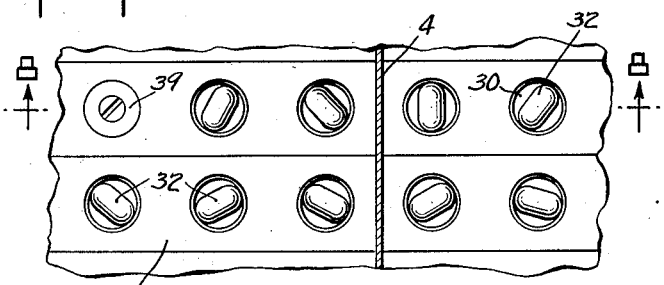
INVENTOR
DOUGLAS M. McBEAN.
WILLIAM T. MARTIN.
BY
Bartlett, Eyre, Scott & Keel
ATTORNEY Patented Sept. 28, 1937

2,094,460

UNITED STATES PATENT OFFICE 2,094,460

BOX FILLING MACHINE

Douglas M. McBean and William T. Martin, Canajoharie, N. Y., assignors to Beech-Nut Packing Company, Canajoharie, N. Y., a corporation of New York Application March 21, 1935, Serial No. 12,286

9 Claims. (Cl. 226—2)

The present invention relates to machines for filling boxes and comprises an improved machine of this type particularly adapted for filling small boxes, as for example, candy boxes, with an assortment of different articles. More specifically, the invention comprises an improved machine adapted to deliver to a box a controllable number of each of various kinds of articles whereby each box, when filled, will contain the same assortment both as to variety and as to proportions. The improved machine has particular value in the filling of boxes of assorted hard candies, and for convenience such application of the invention will be described and illustrated. It will be understood that the invention in its broadest aspect is concerned with the novel features of the improved machine and not with the particular articles handled thereby.

For a better understanding of the invention reference may be had to the accompanying drawings, of which—

Fig. 5 is a horizontal sectional view along the line 5—5 of Fig. 4;

Fig. 6 is a vertical sectional view along the line 6—6 of Fig. 5.

Fig. 7 is a detail view on an enlarged scale of a portion of the article conveyor; and Fig. 8 is a sectional view along the line 8—8 of Fig. 7.

Figure 1:
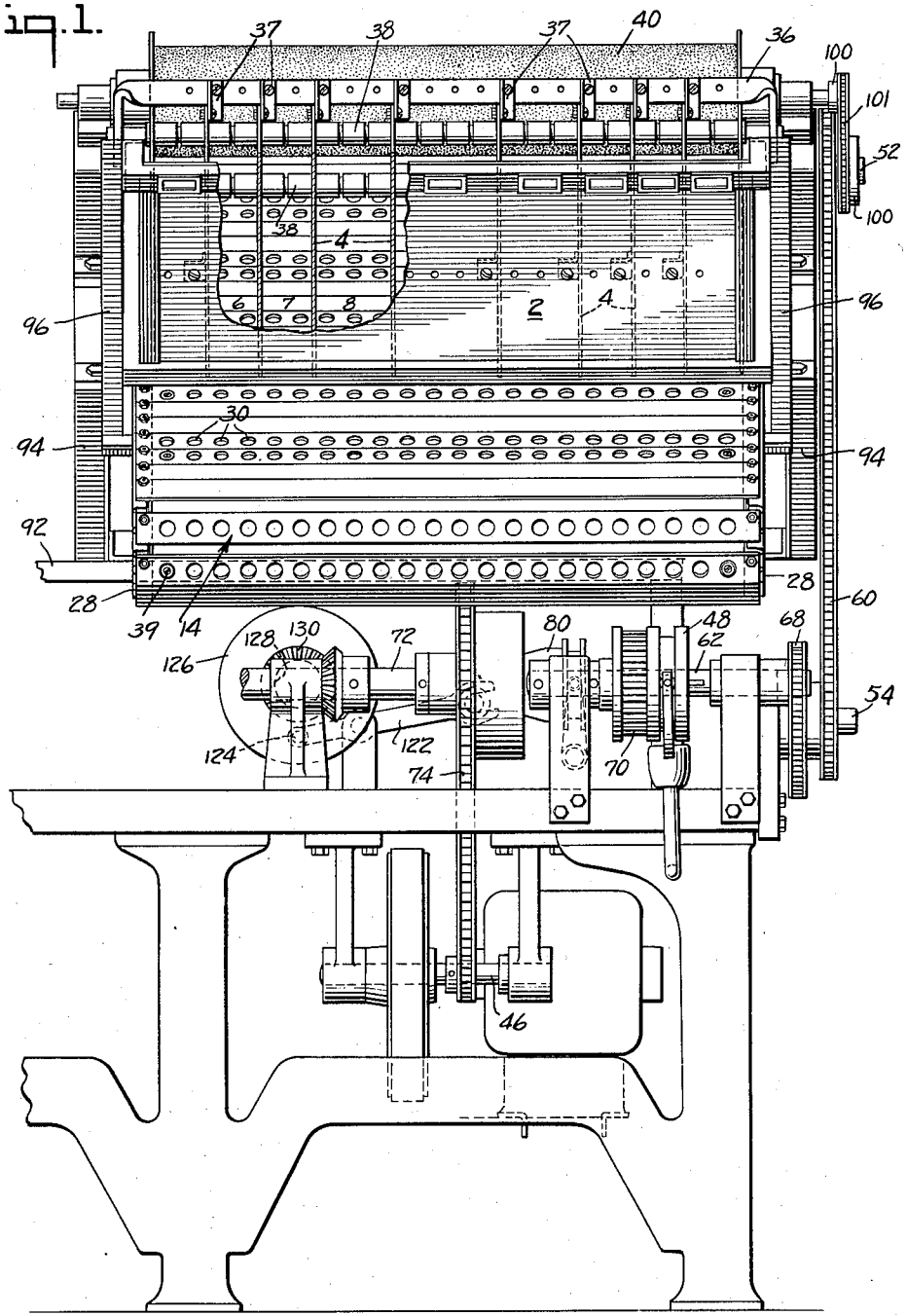
Fig. 1 is a front view of a machine embodying the invention.

In general, the machine illustrated in the drawings comprises an article or candy supplying means 2, divided by partitions 4 into a plurality of compartments 5 to 13 inclusive, a candy carrier or conveyor 14 forming a movable floor for the compartments of the supplying means, a funnel 16 divided by partitions 18 into compartments 19, 20, 21 and 22, each adapted to receive the candies from the conveyor 14, and box feeding means 24 adapted to move boxes 26 into position beneath the funnel 16 to receive the candies from the various compartments thereof.

The traveling conveyor 14 comprises a plurality of parallel slats arranged with their lateral edges in juxtaposition and secured at their ends by suitable bolts to links of chain belts 28. Certain of the slats of conveyor 14 are provided with a series of indentations or pockets 30 of a size sufficient to receive one, and only one, candy 32. In the particular embodiment of the invention illustrated, pairs of slats provided with the pockets 30 alternate with pairs of slats in which there are no pockets.

The candy supplying means 2 is in the form of a hopper and is positioned above the conveyor 14 so that candies in the various compartments thereof will drop into the pockets 30 and be carried along therein as the conveyor passes beneath the compartments. The partitions 4 are removably secured to the front wall of supply means 2 and are held in spaced relation by means of a pair of slotted brackets 34 on the forward end of the receiving means and a bar 36 which is positioned horizontally over the top of the machine and to which are bolted a plurality of connecting members 37 secured to the partitions 4. Slotted bars 38 positioned at the rear of the receiving means also assist in supporting and spacing the partitions 4. Brackets 34, and bars 38, as indicated, are each provided with a sufficient number of slots to permit the insertion if desired of a partition between each pocket 30 of the conveyor. The front wall of supply means 2 and bar 36 are each perforated to accommodate sufficient additional connecting members for the full number of partitions. In the drawings, eight partitions are shown, dividing the supplying means into the nine compartments 5 to 13 inclusive, of which compartments 5, 6, 7, 11, 12 and 13 span two pockets 30, central compartment 9 spans four pockets, and intermediate compartments 8 and 10 each span three pockets. When it is desired to reduce the number of candies to be carried from any particular compartment of the supplying means 2, a plug 39, of a size to fill a pocket 30, may be inserted into a pocket and secured therein by screw means; the base of each pocket 30 being provided for this purpose with a centrally disposed threaded hole 41 (see Fig. 8). For simplicity, the screw holes 41 have not been illustrated in all of the drawings. In the particular embodiment of the invention illustrated, plugs 39 are inserted in the end pockets of one of each pair of pocketed slats of the conveyor.

In operating the machine, each of the compartments of the supplying means is first filled with a supply of different flavored candy. The conveyor 14 which is suitably driven by means hereinafter described, tends to carry the candies upward toward the funnel 16. Before reaching the funnel, the conveyor passes under a rotating brush or drum which rotates in a direction to prevent egress from the receiving means of all candies except those within the pockets 30.

When the slats of the conveyor carrying the candies 32 thus move beyond the drum 40 and reach a position over the funnel 16, the candies fall from the pockets 30 into the several compartments of the funnel. As shown best in Fig. 3, the end compartment 19 will receive candies which have been carried from the three compartments 5, 6 and 7 of the supplying means, compartment 20 will receive candies from compartment 8 and will receive half of the candies which have been carried from the compartment 9. Funnel compartment 21 will receive the rest of the candy carried from compartment 9 and also all of those carried from compartment 10, while compartment 22 will receive candies from compartments 11, 12 and 13. Thus, as the pockets of an adjoining pair of slats are emptied into the compartments of funnel 16, compartments 19 and 22 will each receive three candies of one flavor and four candies of each of two different flavors, and compartments 20 and 21 will each receive four of one flavored candy and six of a different flavored candy. These candies fall through the funnel compartments, pass shutter controlled outlets 42 (Fig. 6) at the base of the funnel compartments and drop through directed passages in a fixed block 43 into the boxes 26 and fill them to about one-quarter of their capacity. A shutter 44 closes the outlets 42 during movement of the boxes from one receiving position to the next as hereinafter described. When the pockets of the next pair of slats are emptied into the funnel, compartment 19 deposits candy into a fresh box 26, compartment 20 deposits candy into the box 26 which had previously been one-quarter filled from compartment 19, and which, during the interim has been moved from one candy receiving position to the next. This same box 26, during the next filling operations, receives candy successively from compartments 20 and 21 and thereafter moves to the closing and wrapping station (not shown).

The endless conveyor 14 and chains 28 to which it is secured may be coupled by any suitable means to the main drive shaft 46 of the machine. Preferably, as shown best in Figs. 1 and 2, a clutch 48 is provided for disconnecting the conveyor driving mechanism from the main drive shaft. In the particular machine illustrated, the chains 28 pass over aligned sprockets on a pair of shafts 50 and 52 of which the latter is driven from an auxiliary drive shaft 54 by means of sprockets 56 and 58 and a chain belt 60. Shaft 54 is in turn driven from a shaft 62 by means of sprockets 64 and 66 and a chain belt 68. Shaft 62 is coupled, by means of clutch 48, intermeshing gears 70, shaft 72, and chain 74 to drive shaft 46. Clutch 48 is controlled from the rear of the machine by means of a suitable lever 76. A control lever 78, also at the rear of the machine, controls a main clutch 80 (Fig. 1) for stopping and starting the entire machine.

Shaft 50 has secured thereto a pair of sprockets 82 over which pass the chains 28, and which, together with shaft 50, are movable toward and away from the shaft 52 to permit of assembly of the conveyor mechanism. As shown best in Fig. 2, the means for moving the sprockets 82 and shaft 50 comprise a pair of threaded bolts 84, secured at one end to the sprockets 82 and each mounted in a pair of threaded nuts 86. Nuts 86 are rotatably mounted in bearings 88 secured on a support frame 90. Frame 90, which is supported from a platform 92 of the machine, by means of girders 94, has secured thereto brackets 96 carrying the supplying means 2. Frame 90 also carries a plurality of shafts 98 at the ends of which are carried idler sprockets 99 for guiding and positioning the chain belts 28 of the conveyor.

Brush 40 is driven from shaft 52 by means of sprockets 100 and chain 101.

To prevent sticking of the candies in the pockets 30, means are provided for jarring the slats of the conveyor 14 as they pass over the entrance to funnel 16. These means (see Figs. 2, 3 and 4) include a plurality of rollers 102 each mounted in the forked end of a rod 104 secured to a cross bar 106 and a plurality of tension springs 108 each secured at one end to the rear wall of funnel 16 and at its other end to one of a plurality of rods 110 mounted on the cross bar 106. Bar 106 is rotatably mounted in bearings 112 secured to the side walls of funnel 16. With this arrangement, as the slats of conveyor 14 move past the opening to funnel 16 and the unsecured edges thereof extend outwardly from the curved surface of the chains 28, the rollers 102 ride up on the slats, rocking the cross bar 106 against the tension of springs 108. With the continued movement of the conveyor, the rollers clear the extended edge of a slat and the springs 108 force the rollers against the succeeding slat with sufficient impact to dislodge all candies 32 from the pockets 30.

Figure 2:
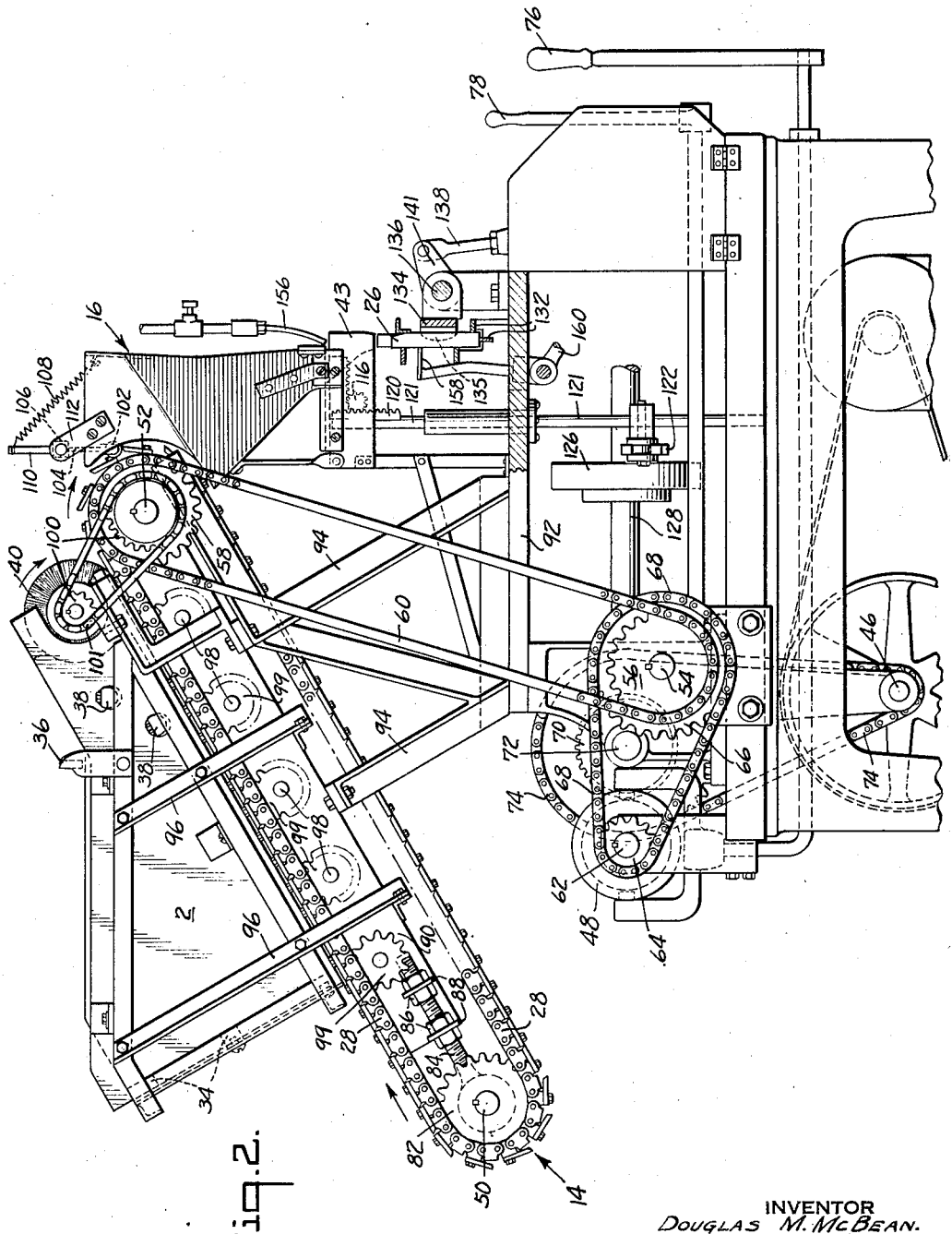
Figs. 2 and 3 are side and top plan views respectively of the machine of Fig. 1.
Figure 4:
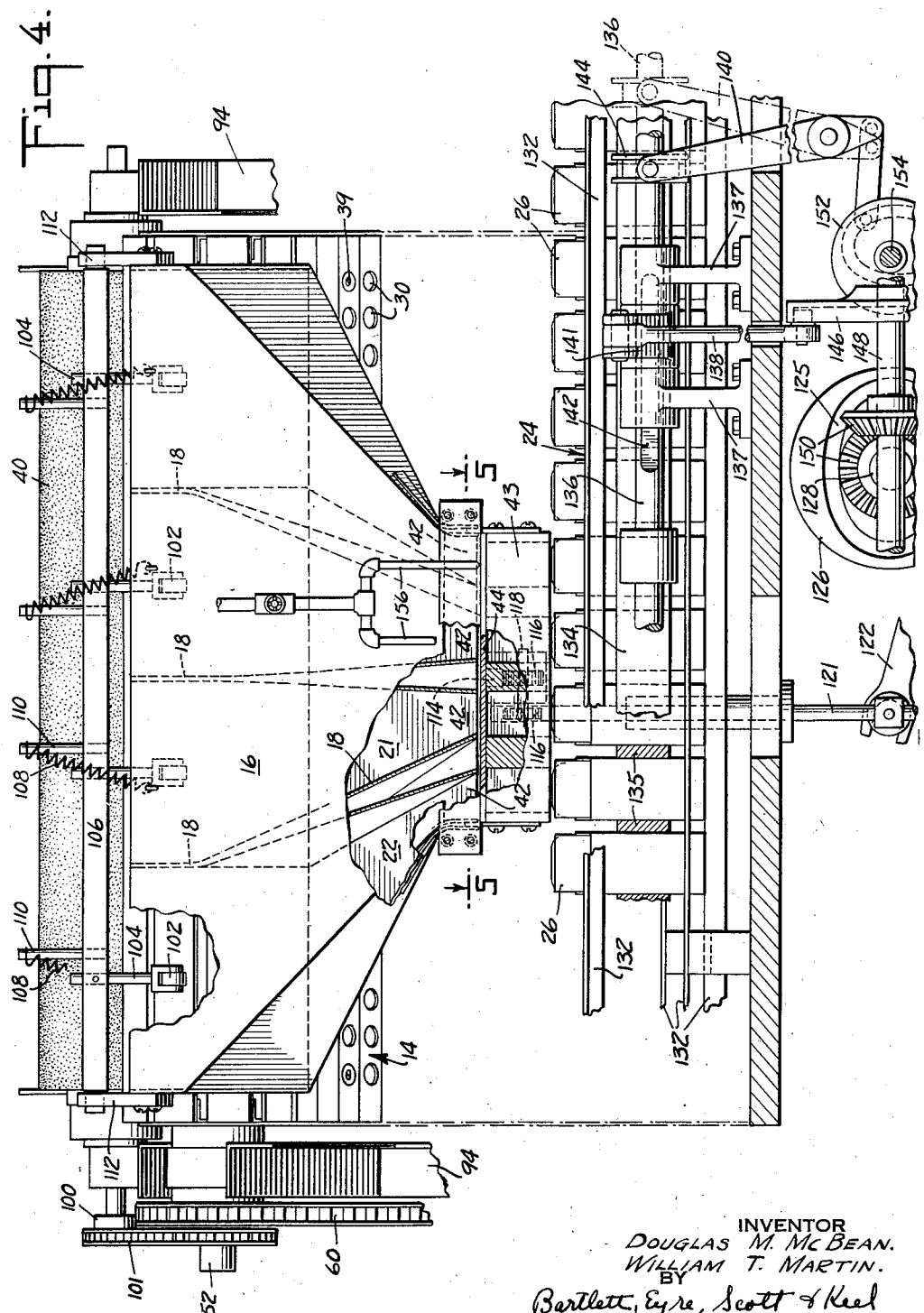
Fig. 4 is a rear view of the upper portion of the machine drawn on a slightly enlarged scale.

The shutter 44 controlling the outlets 42 from the funnel compartments should be moved in fixed or timed relation with the conveyor mechanism and box feeding means. For this purpose a rack 114 is secured to the under side of the shutter and is reciprocated by means of one of a pair of pinions 116 secured to a short horizontal shaft 118 (Figs. 5 and 6). The other pinion 116 meshes with a vertically movable rack 120 (Fig. 2) secured to a rod 121 which is reciprocated by means of a pivoted lever 122, one end of which is coupled to the rod 121 and the other end of which carries a cam roller 124 which rides in a cam groove 125 on a cam 126 (Fig. 4). Cam 126 is mounted on a shaft 128 geared to the driven shaft 72 by pinion gears 130 (Fig. 1). Thus, when the machine is in operation, shutter 44 is reciprocated to alternately open and close the outlets 42 from the funnel compartments. As shown in Fig. 4, the shape of cam groove 125 is such as to insure quick opening and closing movements of shutter 44 with a relatively longer period of closure thereof.

Figure 3:
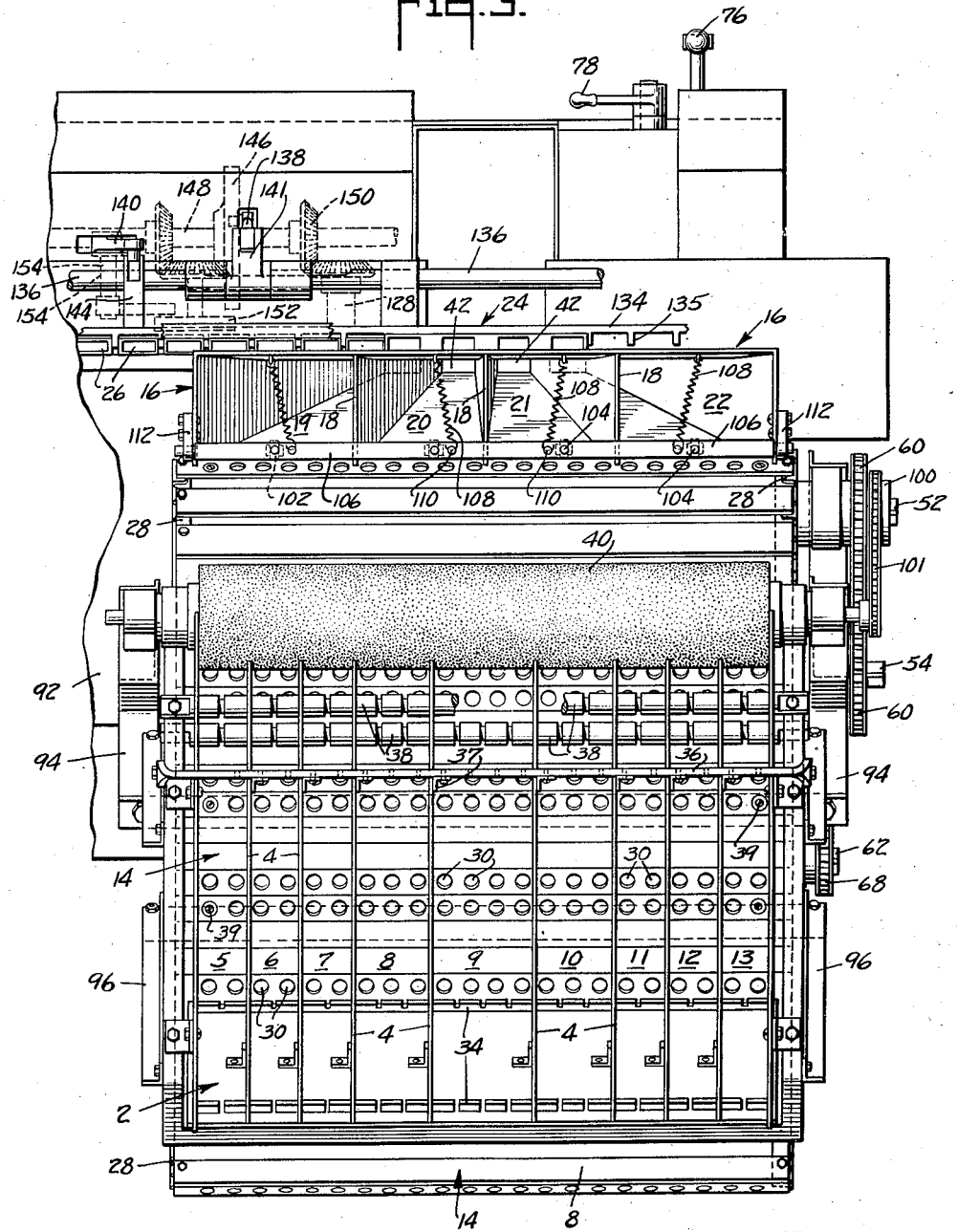

The means for feeding the boxes 26 by a step-by-step movement may be such as have heretofore been used in box filling machines. In the particular embodiment of the invention illustrated, these means include a box supporting framework 132, and a box spacing and aligning device 134 having spacing fingers 135. Device 134 is rigidly secured to a horizontal shaft 136, which is mounted in suitable fixed bearings 137. Shaft 136 is adapted to be rocked about its longitudinal axis by means of an operating arm 138 and to be longitudinally reciprocated by means of an operating lever 140. Arm 138 is keyed to shaft 136 by means of a sleeve 141 having a flattened surface cooperating with a flattened section 142 on the shaft to insure rocking of the shaft upon vertical reciprocation of arm 138 while permitting longitudinal movement of the shaft within the sleeve. Lever 140 is coupled to shaft 136 by means of a roller secured to one end of the lever and engaging a circumferential groove in a collar 144 secured to the shaft. Arm 138 is reciprocated by suitable cam means 146 secured on a shaft 148 driven from shaft 128 by bevel gears 150 and lever 140 is oscillated by suitable cam means 152 secured on a short auxiliary shaft 154 driven from shaft 148 (Fig. 3). The arrangement of the box feeding means above described is such that during movement of shaft 136 to the left, as viewed in Fig. 4, the fingers 135 of device 134 advance the boxes 26 along the framework 132 a distance corresponding to the distance between adjacent outlets of block 43. Arm 138 is then moved downwardly to rotate shaft 136 into a position where the fingers 135 are lifted out of engagement with boxes 26 and the shaft is maintained in this angular position during movement of the shaft by arm 140 to the right hand position. The fingers then descend to engage the succeeding boxes which are similarly advanced during the next longitudinal movement of shaft 136. Thus during each reciprocation of shaft 136 each box 26 advances from one funnel outlet to the next and a fresh box is brought into position beneath compartment 19. To insure proper opening of the boxes, blasts of air from jets 156 are preferably directed at the opened boxes as they advance into position beneath compartments 19 and 20.

Also, if desired, suitable means may be provided for gently tapping the boxes during filling to prevent candies from sticking to the inner walls of the boxes and thereby clogging the entrance to the box. Means for such purpose are indicated in part in Fig. 2 as including a tapping finger 158 which may be rocked by means of an operating arm 160 coupled to any suitable driven shaft of the machine.

From the above description, it will be apparent that with the machine set up as illustrated and with a different variety of candy in each of the nine compartments of the supply means, each box 26 will be filled with an assortment of nine different candies. If it is desired to increase the number of kinds of candy in each box it is only necessary to insert a corresponding number of additional partitions in the supply means. If fewer kinds of candy are desired in the assortments, some of the partitions 4 may be removed or two or more of the compartments may be filled with the same kind of candy. If it is desired to reduce the total number of candies per box without reducing the number of kinds thereof, the reduction may be made either by plugging up the desired number of pockets or by increasing the number of compartments and leaving some of them empty. Thus the invention comprises a completely automatic machine for filling boxes with an assortment of candies or the like that is simple to operate and that may be readily adjusted to vary not only the total number of articles per box but also the variety of the articles and the number of each different kind of article.

It will be understood that the invention in its broadest aspects is not limited to the particular constructional features illustrated and that various changes might be made or various parts omitted without departing from the scope of the appended claims.

The following is claimed:

1. A machine for filling boxes with a predetermined assortment of articles comprising in combination, article supply means, means for dividing said supply means into a plurality of compartments, an endless conveyor forming a movable floor for the compartments of the supply means and adapted to carry articles therefrom, driving means for said conveyor, article delivery and directing means positioned to receive the articles carried from said compartments by said conveyor and means for feeding boxes into position to receive articles from said delivery means whereby, when each of said compartments of said supply means contains different articles, each box is filled with an assortment comprising articles from each compartment of said supply means, said delivery and directing means including a plurality of compartments each positioned to receive articles carried by different longitudinal areas of said conveyor and each provided with a separate outlet, and means for intermittently opening and closing said outlets, and said box feeding means including means for progressively advancing a row of boxes into position beneath said separate outlets whereby each box will be progressively filled with articles from each of said last mentioned compartments.

2. In a machine for filling boxes, the combination comprising an article supplying means provided with a plurality of compartments, an endless conveyor forming a movable floor for the compartments of said supplying means and provided with a plurality of pockets, means for driving said conveyor in a direction to cause each pocket thereof to pass beneath but one compartment of said supply means whereby when the compartments are filled with different articles a corresponding variety of articles will be carried therefrom in the pockets of said conveyor, article delivery and directing means positioned to receive articles falling from said conveyor pockets as the conveyor passes from the upper to the lower stretch and means for feeding boxes into position to receive articles from said delivery means.

3. The combination according to claim 2 including a shutter operating when closed to prevent articles from leaving said delivery means, and means for intermittently opening and closing said shutter whereby articles are delivered from said delivery means only when said box feeding means has fed a box into position to receive the same.

4. The combination according to claim 2 wherein said conveyor comprises a plurality of slats arranged with their lateral edges in juxtaposition and wherein means, operated by the slats during their passage from the upper to the lower stretch of the conveyor, is provided for intermittently jarring the conveyor to prevent sticking of the articles in said conveyor pockets.

5. A machine for filling boxes comprising in combination article supply means including an open bottom hopper and a plurality of parallel removable partitions therein dividing the hopper into a plurality of compartments, an endless conveyor having longitudinally displaced groups of article receiving pockets therein and forming a movable floor for said supply means, means for driving said conveyor in a direction parallel to the partitions of said supply means, funnel means positioned to receive articles from said conveyor pockets, a shutter controlling delivery of articles from said funnel means, means for feeding boxes into position to receive articles from said funnel means, and means inter-related with said conveyor driving means and with said box feeding means for intermittently opening and closing said shutter whereby articles from different groups of said conveyor pockets may be delivered to different boxes.

6. A machine according to claim 5 wherein said funnel means includes a plurality of compartments each positioned to receive articles from pockets of different longitudinal areas of said conveyor and each having a separate outlet controlled by said shutter and wherein said box feeding means includes means for progressively advancing a row of boxes into position beneath said separate outlets whereby each box will be progressively filled with articles from each funnel compartment.

7. A box filling machine comprising in combination article supply means having a plurality of separate compartments, an endless conveyor forming a movable floor of the compartments of the supply means and provided with a plurality of spaced article receiving pockets, article delivery means having inlet and outlet passages and positioned to receive articles falling from the pockets of said conveyor as the conveyor passes from the upper to the lower stretch, box feeding means for delivering boxes into position to receive articles from the outlet passages of the delivery means, a shutter controlling said outlet passages and mechanism for continuously moving said conveyor and for intermittently moving said shutter whereby when the compartments of said supply means contain different kinds of articles, boxes will be filled with an assortment thereof and the number of a certain kind of article delivered to a box will depend upon the number of pockets in the portion of the conveyor forming the movable floor of the compartment containing that particular kind of article.

8. In a box filling machine, the combination comprising article supply means divided into a plurality of compartments each adapted to contain a plurality of different articles, article delivery and directing means divided into a plurality of compartments and each having a separate outlet, means for conveying a predetermined number of articles from each compartment of said supply means to a predetermined one of said compartments of the delivery means, and means for progressively advancing a row of boxes into position beneath said separate outlets whereby each box will be progressively filled with a plurality of articles from each compartment of the delivery and directing means.

9. In a machine for filling boxes, the combination comprising an article supplying means provided with a plurality of compartments, an endless conveyor forming a movable floor for the compartments of said supplying means and provided with a plurality of pockets, means for driving said conveyor in a direction to cause each pocket thereof to pass beneath but one compartment of said supply means whereby when the compartments are filled with different articles a corresponding variety of articles will be carried therefrom in the pockets of said conveyor, article delivery and directing means divided into a plurality of compartments each adapted to receive articles from pockets of different longitudinal areas of said conveyor and each having a separate outlet passage and means for progressively advancing a row of boxes into position beneath said separate outlets whereby each box will be progressively filled with a plurality of articles from each compartment of the delivery and directing means.

DOUGLAS M. McBEAN.
WILLIAM T. MARTIN.